(12) United States Patent
Van Den Brink (10) Patent No.: US 9,248,931 B2
(45) Date of Patent: Feb. 2, 2016

(54) METHOD AND DEVICE FOR REMOVING A RING-SHAPED LABEL FROM A PACK OF SUBSTANTIALLY IDENTICAL, ABUTTING RING-SHAPED LABELS, LABEL-TRANSFERRING DEVICE AND SYSTEM FOR PRODUCING PLASTIC INJECTION-MOULDED PRODUCTS

(75) Inventor: Willem Van Den Brink, Harskamp (NL)

(73) Assignee: Polymac B.V., Ede (NL)

( * ) Notice: Subject to any disclaimer, the term of this patent is extended or adjusted under 35 U.S.C. 154(b) by 135 days.

(21) Appl. No.: 14/344,286

(22) PCT Filed: Aug. 30, 2012

(86) PCT No.: PCT/NL2012/050595
§ 371 (c)(1),
(2), (4) Date: May 28, 2014

(87) PCT Pub. No.: WO2013/039383
PCT Pub. Date: Mar. 21, 2013

(65) Prior Publication Data
US 2014/0341693 A1    Nov. 20, 2014

(30) Foreign Application Priority Data

Sep. 12, 2011  (NL) ...................................... 2007391

(51) Int. Cl.
*B65C 9/12*         (2006.01)
*B65H 3/48*        (2006.01)
(Continued)

(52) U.S. Cl.
CPC ................. *B65C 9/12* (2013.01); *B29C 31/008* (2013.01); *B65C 9/0006* (2013.01); *B65H 3/48* (2013.01); *B29C 45/14008* (2013.01); *B29C 2045/14918* (2013.01)

(58) Field of Classification Search
USPC .................. 414/795.4, 795.5, 797, 801, 908, 414/416.02; 294/183, 64.3, 87.1; 156/443; 264/275
See application file for complete search history.

(56) References Cited

U.S. PATENT DOCUMENTS 2,743,478 A  5/1956  Harlow et al.
3,450,586 A  6/1969  Caulford et al.
(Continued)

FOREIGN PATENT DOCUMENTS

DE          951344 C       10/1956
DE    102007002854 A1       7/2008
(Continued)

OTHER PUBLICATIONS

Dutch Search Report Issued in NL 2007391 mailed Apr. 26, 2012.
(Continued)

*Primary Examiner* — Paul T Chin
(74) *Attorney, Agent, or Firm* — Banner & Witcoff, Ltd.

(57) ABSTRACT

A device for removing a ring-shaped label from a pack of substantially identical, abutting ring-shaped labels comprises a pick-up head which is provided with a stop surface and retaining devices for holding a ring-shaped label against the stop surface. The device comprises a storage holder for accommodating the pack of ring-shaped labels. A displacement device can displace the pack of ring-shaped labels from a storage position, in which the pack of ring-shaped labels is situated at a distance from the stop surface of the pick-up head, to a discharge position, in which the pack of ring-shaped labels is pushed against the stop surface of the pick-up head by means of an outer ring-shaped label. A blast of air is delivered when the outer ring-shaped label is held against the stop surface of the pick-up head. The blast of air is directed laterally between the outer ring-shaped label and the adjacent ring-shaped label of the pack of ring-shaped labels, so that the adjacent ring-shaped label is blown off the outer ring-shaped label.

20 Claims, 8 Drawing Sheets

(51) Int. Cl.
  *B29C 31/00*  (2006.01)
  *B65C 9/00*  (2006.01)
  *B29C 45/14*  (2006.01)

(56) References Cited

U.S. PATENT DOCUMENTS

| | | | | |
|---|---|---|---|---|
| 3,718,217 | A | * | 2/1973 | Stobb ................... B65H 3/56 414/797 |
| 3,862,815 | A | | 1/1975 | Roczynski et al. |
| 4,625,953 | A | * | 12/1986 | Hamatani ............ B65H 3/0883 294/183 |
| 4,645,401 | A | * | 2/1987 | Hopkins ............ G11B 23/0021 414/222.12 |
| 5,890,346 | A | * | 4/1999 | Guess ................. B65B 25/002 414/797 |
| 7,572,095 | B2 | * | 8/2009 | Covarrubias ......... B65G 59/106 414/797 |
| 8,262,146 | B2 | * | 9/2012 | Stoppel ............. H01L 21/67132 294/183 |
| 2001/0011828 | A1 | * | 8/2001 | Ujita .................... B23K 3/0623 294/183 |
| 2007/0183884 | A1 | * | 8/2007 | Pechtl ..................... B41F 15/26 414/797 |
| 2011/0229297 | A1 | * | 9/2011 | Frazier .................. B65G 59/10 414/765.6 |
| 2014/0339733 | A1 | * | 11/2014 | Van Den Brink . B29C 45/14008 264/279 |

FOREIGN PATENT DOCUMENTS

| | | |
|---|---|---|
| GB | 1192352 A | 5/1970 |
| GB | 1371950 A | 10/1974 |
| JP | 2010072301 A | 4/2010 |

OTHER PUBLICATIONS

International Search Report Issued in PCT/NL2012/050595 mailed Jan. 30, 2013.

* cited by examiner

METHOD AND DEVICE FOR REMOVING A RING-SHAPED LABEL FROM A PACK OF SUBSTANTIALLY IDENTICAL, ABUTTING RING-SHAPED LABELS, LABEL-TRANSFERRING DEVICE AND SYSTEM FOR PRODUCING PLASTIC INJECTION-MOULDED PRODUCTS

The present application is a U.S. National Phase filing of International Application No. PCT/NL2012/050595, filed on Aug. 30, 2012, designating the United States of America, which in turn claims priority to Netherlands Application 2007391, filed Sep. 12, 2011. The present application claims priority to and the benefit of all the above-identified applications, which are incorporated by reference herein.

The invention relates to a device for removing a ring-shaped label from a pack of substantially identical, abutting ring-shaped labels. The invention relates in particular to a device for removing a ring-shaped label from a pack of substantially identical, abutting ring-shaped labels and transferring the removed label into a mould cavity of an injection mould. With "in-mould labelling", a label is placed in a mould cavity of an injection mould and plastic is then injected into the mould cavity in order to form an injection-moulded product with the label.

WO2006/082006 discloses a device for transferring a label in a substantially cylindrical injection mould. A film having a thickness of 40-140 μm is used as the label. The label is substantially rectangular and is situated on top of a stack. The label is taken from the stack by suction cups. The suction cups are each arranged on one end of punches which are passed through a semicylindrical cover. By pulling the punches upwards, the label is placed against the inner periphery of the cover and preformed in a substantially semicylindrical shape. Subsequently, the cover with the label which has been accommodated therein is placed over an insertion mandrel which is substantially cylindrical. The label is then wound around the insertion mandrel. At its periphery, the insertion mandrel is provided with suction openings by means of which the label can be pressed against the periphery of the insertion mandrel using underpressure. The inner diameter of the mould cavity is slightly greater than the outer diameter of the insertion mandrel with the label pressed against it. The distance between the outer periphery of the mandrel and the inner periphery of the mould cavity is kept as small as possible, so that the label, after it has been inserted into the mould cavity, can be transferred from the mandrel to the inner periphery of the mould cavity by blow pressure.

As the label is made from a film having a thickness of 40-140 μm, it is difficult to remove in each case only a single label from the stack by means of the suction cups. When the top label is taken from the stack, the label situated underneath has the tendency to "stick" to the top label. In the case of labels of relatively small dimensions, there is a risk that the "sticking" label will be taken from the stack together with the top label, so that the suction cups inadvertently pick up two labels. The "sticking" label will then fall off the top label in an uncontrolled manner, which may give rise to jams or damage. In the case of labels having relatively large dimensions, the "sticking" label may not be lifted up in its entirety, but may end up being moved or even folded on the stack. Then, it is subsequently hardly possible, if at all, to take said label without straightening said label first.

SUMMARY OF THE DISCLOSURE

It is an object of the invention to provide a device for removing a ring-shaped label from a pack of substantially identical, abutting ring-shaped labels, in which the risk of inadvertently taking several ring-shaped labels from the pack is small, in particular for use with ring-shaped labels having a relatively small thickness, such as a thickness of 40-140 μm.

According to the invention, this object is achieved by means of a device for removing a ring-shaped label from a pack of substantially identical, abutting ring-shaped labels, in which the device comprises:

- a pick-up head which is provided with a stop surface and retaining devices for holding a ring-shaped label against the stop surface,
- a storage holder for accommodating the pack of ring-shaped labels, which storage holder is provided with a guide rod for receiving a central opening of the ring-shaped labels of the pack of ring-shaped labels, and which storage holder is provided with a stop for determining, when the pack of ring-shaped labels is accommodated on the guide rod, a storage position of said pack of ring-shaped labels, in which a bottom ring-shaped label of the pack of ring-shaped labels abuts against the stop on account of the force of gravity and a top ring-shaped label of said pack is situated at a distance from the stop surface of the pick-up head,
- a displacement device for displacing, when the pack of ring-shaped labels is accommodated on the guide rod in the storage position, at least a part of said pack of ring-shaped labels along the guide rod to a discharge position, in which the top ring-shaped label of the pack of ring-shaped labels or a part thereof is pushed against the stop surface of the pick-up head and the top ring-shaped label can be held by the retaining devices of the stop surface of the pick-up head, in which the displacement device is designed, when the pack of ring-shaped labels is accommodated on the guide rod in the storage position, to exert such an impact force on said pack of ring-shaped labels that at least a part of said pack moves autonomously, counter to the effect of the force of gravity, to the discharge position, and the device is provided with an air-blasting device for dispensing at least one blast of air which, when the top ring-shaped label is held against the stop surface of the pick-up head by the retaining devices, is directed between, preferably laterally between, the retained, top ring-shaped label and the adjacent ring-shaped label of the pack of ring-shaped labels, in such a manner that said adjacent ring-shaped label is blown off the retained, top ring-shaped label, and preferably also against the adjacent, ring-shaped label which is situated underneath.

According to the invention, the pack of ring-shaped labels forms a store which is accommodated on the guide rod of the storage holder. The guide rod runs, for example, obliquely upwards with respect to the horizontal or substantially vertical. The pack of ring-shaped labels is pushed onto the guide rod. The guide rod comprises an external diameter which is adapted to the central opening of the ring-shaped labels. The external diameter of the guide rod is slightly smaller than the central opening of the ring-shaped labels, for example, approximately 0.5 mm smaller.

In the storage position or waiting position, the top ring-shaped label of the pack of ring-shaped labels is situated at a distance from the stop surface of the pick-up head. In order to remove the top ring-shaped label, the entire pack of ring-shaped labels or a part of said pack, preferably several ring-shaped labels of said pack, is displaced by the displacement device to the discharge position, substantially together as one piece. Thus, the top ring-shaped label of the pack of ring-shaped labels or of said part is pushed against the stop surface of the pick-up head, after which the retaining devices hold said top label against the stop surface. In the discharge position, the pack of ring-shaped labels is accommodated on the guide rod.

According to the invention, displacing the pack of ring-shaped labels or of a part thereof to the discharge position is achieved by exerting an impact force on said pack of ring-shaped labels in the storage position, i.e. said impact force is exerted on the entire pack or on a part thereof while the pack of ring-shaped labels is in the storage position. The pack of ring-shaped labels or a part thereof, preferably comprising several ring-shaped labels, thus receives an impulse which is sufficiently large to cause said pack or said part thereof to move autonomously to the discharge position. The pack of ring-shaped labels or a part thereof is "launched", as it were. While the pack or a part thereof, preferably comprising several ring-shaped labels, moves along the guide rod substantially together as one piece, said ring-shaped labels bear against one another loosely or a number of ring-shaped labels may even become slightly detached from one another. The pack of ring-shaped labels thus forms a loosely cohesive combination while said pack or the part thereof is moving along the guide rod.

In the discharge position, i.e. when the pack of ring-shaped labels or the part thereof is pushed against the stop surface of the pick-up head by means of the top ring-shaped label and the top ring-shaped label is then held by the retaining devices against the stop surface of the pick-up head, the air-blasting device blasts one or more blasts of air or jets of air between the retained label and the ring-shaped label adjacent thereto. The adjacent ring-shaped label is then blown off the retained label and against the neighbouring ring-shaped labels. Since the ring-shaped labels, due to being "launched" and moved along the guide rod, loosely bear against each other or are even slightly apart, it is possible, in particular with very thin and light labels, for example, plastic labels having a thickness of 40-140 μm, to blow effectively between the retained label and the adjacent label. As a result thereof, it is possible to reliably separate the retained label from the rest of the pack and it is ensured that in each case only a single ring-shaped label is removed from the pack of ring-shaped labels.

It should be noted that U.S. Pat. No. 2,743,478, with respect to which claim 1 is delimited, discloses an automatic moulding device for producing phonograph records. The moulding device comprises a press having an upper platen and a lower platen. The upper platen can be opened and closed by means of a hinge. The lower platen can be moved vertically between an open and a closed position. When the press is open, a top label is introduced in the upper platen and a bottom label is introduced into the lower platen. To this end, a label is in each case removed from a stack of labels and transferred to the respective platen. The stack of labels is pushed onto a vertical spindle by means of central openings. The bottom label of the stack rests on a platform with a central opening, so that the platform can also slide along the vertical spindle. The lower side of the platform is situated on the upper end of a spring, while the lower end of said spring rests on a base plate which is attached to the spindle. Therefore, the platform can move up and down on the spindle, depending on the number of labels of the stack. The base plate can be actuated by a pneumatic cylinder. The stack of labels is pushed against a suction head in its entirety. When the top label comes into contact with the suction head, the labels in the stack situated underneath are pushed firmly against said top label. The pack of labels is locked between the platform which is prestressed by the spring and the suction head. Since the labels of phonograph records are relatively thick and heavy, the problem of the top label "sticking" to the label situated underneath is hardly an issue, if at all. Separation of the top label takes place without the stack of labels having been "detached" (as the stack is compressed) and without using a blast of air to separate the top label from the label situated underneath.

In a preferred embodiment, the displacement device is designed to exert such an impact force on said pack of ring-shaped labels, when the pack of ring-shaped labels is accommodated on the guide rod in the storage position, that at least a part of said pack moves autonomously, counter to the effect of the force of gravity, to the discharge position, and, when the top ring-shaped label in said discharge position is pushed against the stop surface of the pick-up head and is held against it, several of the ring-shaped labels situated underneath hang around the guide rod and can be moved freely along the guide rod in the direction away from the pick-up head, i.e. downwards along the guide rod.

According to the invention, the displacement device may be designed to exert such an impact force on said pack of ring-shaped labels, when the pack of ring-shaped labels is accommodated on the guide rod in the storage position, that said entire pack moves autonomously, counter to the effect of the force of gravity, to the discharge position. In that case, the bottom ring-shaped label of said pack in the discharge position, when the top ring-shaped label is pushed against the stop surface of the pick-up head and is held against it, hangs freely around the guide rod and said bottom ring-shaped label, together with the other ring-shaped labels of the pack, can be moved back to the storage position without the retained, top ring-shaped label.

If the pack consists of a relatively large number of ring-shaped labels, it is possible according to the invention to not displace the entire pack, but only a part of said pack to the discharge position. In this case, when the pack of ring-shaped labels is accommodated on the guide rod in the storage position, the displacement device may be designed to exert such an impact force on said pack of ring-shaped labels or on a part of said pack, that a part of the pack, which part comprises several ring-shaped labels, moves autonomously, counter to the effect of the force of gravity, to the discharge position. In this case, the bottom ring-shaped label of the total pack continues to rest against the stop of the storage holder. The part of the pack which is displaced along the guide rod also comprises a bottom ring-shaped label. In the discharge position, when the top ring-shaped label is pushed against the stop surface of the pick-up head and is held against it, this bottom ring-shaped label hangs freely around the guide rod. This bottom ring-shaped label of the displaced part of the pack, together with the other ring-shaped labels of the displaced part of the pack, without the retained, top ring-shaped label, can also be moved back against the non-displaced labels of the pack, so that the storage position is reached again. Incidentally, it is also possible according to the invention to move only a single ring-shaped label of the pack to the discharge position.

In an embodiment, the guide rod is arranged obliquely with respect to the horizontal. In this case, the guide rod may extend at an angle of 20-50° with respect to the horizontal. It is also possible for the guide rod to be arranged at an angle with respect to the horizontal which can be adjusted by means of an adjustment device, such as an adjusting screw. As a result of the inclined position of the guide rod, the pack of ring-shaped labels bears against the stop of the storage container on account of the force of gravity. Incidentally, the guide rod may also be arranged substantially vertically.

According to the invention, it is preferred that the displacement device is designed in such a manner that the impact force which is exerted on the pack of ring-shaped labels in the storage position, i.e. on the entire pack or on a part thereof, is formed by a blast of air which is blown against one or more of the ring-shaped labels of said pack. If the device is in continuous use and removes in each case a ring-shaped label of the pack at high speed, the device will operate reliably for a long time.

The pack of ring-shaped labels or a part thereof may be blown along the guide rod to the discharge position in different ways. For example, the guide rod comprises at least a lateral air outlet which is designed such that, when the pack of ring-shaped labels is accommodated on the guide rod, a blast of air which is blown from the air outlet is blown against one or more of the ring-shaped labels of said pack in order to move at least a part of said pack of ring-shaped labels, i.e. the entire pack or a part of the pack comprising one or more ring-shaped labels, autonomously, counter to the effect of the force of gravity, to the discharge position. In this case, the lateral air outlet is directed, for example, obliquely in the direction of the pick-up head, i.e. the blast of air flows from the air outlet in a direction with a component radially outwards and a component in the axial direction of the guide rod towards the pick-up head.

In an embodiment, the air-blasting device is designed to deliver at least one blast of air which, when the top ring-shaped label is held against the stop surface of the pick-up head by the retaining devices, is directed laterally, preferably obliquely radially inwards, between an outer peripheral edge of the retained, top ring-shaped label and an outer peripheral edge of the adjacent ring-shaped label. The retained label and the adjacent ring-shaped label can be efficiently separated from one another by directing the blast of air laterally in between from the outside, for example, obliquely radially inwards.

It is possible for the air-blasting device to be designed to deliver at least one blast of air which is directed in such a manner that, when the top ring-shaped label is held against the stop surface of the pick-up head by the retaining devices, the blast of air flows at least along an inner peripheral edge of a central opening in the retained, top ring-shaped label and along an inner peripheral edge of a central opening in the adjacent ring-shaped label in order to blow said adjacent ring-shaped label back in the direction away from the pick-up head. Instead of or in addition to the lateral blast of air between the outer peripheral edges of the retained label and the adjacent label, one or more blasts of air can be discharged through the central openings of the retained label and the adjacent labels. In this case, said blast of air or blasts of air flow along the inner peripheral edges of the central openings of the ring-shaped labels. As a result, the pack of ring-shaped labels or the part thereof which is moved along the guide rod to the discharge position, with the exception of the retained label, is moved back relatively quickly along the guide rod, so that the storage position is reached again. Even if the guide rod, for example, does not run vertically, but obliquely with respect to the horizontal and the pack of labels tends to return to the storage position more slowly than desired, due solely to the effect of the force of gravity, the pack of ring-shaped labels can be returned relatively quickly to the storage position. By means of the blast of air or blasts of air via the central openings of the ring-shaped labels, the device can thus dispense in each case a single label at high speed in succession, irrespective of the orientation of the guide rod.

In an embodiment, the stop surface of the pick-up head is provided with a peeling section, in which the retaining devices are designed to bend, in the discharge position, a part of the top ring-shaped label against the peeling section in order to move said part of the top ring-shaped label from the adjacent ring-shaped label to create an increased intermediate space inbetween, and in which the air-blasting device is designed to deliver at least one blast of air which, when the top ring-shaped label is held against the stop surface of the pick-up head by the retaining devices, is directed into said increased intermediate space. In this case, the peeling section of the stop surface of the pick-up head may run back with respect to the other part of the stop surface, i.e. the peeling section locally runs off in the direction away from the storage holder.

By bending a part of the retained label, said retained label already tends to become detached from the adjacent label. The risk of the adjacent label "sticking" to the retained label is further reduced when a part of the retained label is peeled off the adjacent label and the blast of air is blown into the increased intermediate space between the peeled-off part of the retained label and the adjacent label. This is particularly advantageous with ring-shaped labels having a relatively large outer diameter, for example, larger than 30 mm.

According to the invention, the ring-shaped labels can be designed in various ways. It is possible for each of the ring-shaped labels to be flat or even, or cup-shaped or dish-shaped. A cup-shaped or dish-shaped ring-shaped label has, for example, a frustoconical shape. As the label, for example, a film having a thickness of 40-140 µm is used. The ring-shaped labels are, for example, delimited by a circular outer peripheral edge. The diameter thereof may be between 10 and 100 mm. In addition, each of the ring-shaped labels, for example, has a central opening which delimits a circular inner peripheral edge. However, it is also possible for each of the ring-shaped labels to comprise, for example, an oval outer peripheral edge. The ring-shaped labels may also be substantially flat or even, i.e. the ring-shaped labels each have a flat front side and a flat rear side. However, the ring-shaped labels may also be designed differently. For example, the ring-shaped labels may be cup-shaped or dish-shaped, i.e. the ring-shaped labels have, for example, a frustoconical shape. In this case, the continuous oblique wall of the dish-shaped labels may also comprise a flat front side and a flat rear side.

The stop surface of the pick-up head is preferably adapted to the shape of the ring-shaped labels. If the ring-shaped labels are substantially flat, the flat front side of the top ring-shaped label is turned towards the stop surface. The stop surface then runs substantially parallel to the flat front side of the top ring-shaped label, except for the peeling section which locally runs off from the flat front side. When using dish-shaped labels, the peeling section of the stop surface also locally runs back with respect to the dish shape of the labels, so that a part of the top label can be bent against that.

It is possible to provide the pick-up head with a central recess, in which the guide rod can be at least partly accommodated in the central recess of the pick-up head, and in which the stop surface of the pick-up head extends around the central recess. The central recess of the pick-up head can be arranged over the head end of the guide rod. The stop surface of the pick-up head is in this case situated around the central recess—in this case, the stop surface is ring-shaped.

In an embodiment, the device is provided with:
  a detection device for detecting when the top ring-shaped label is held against the stop surface of the pick-up head by the retaining devices,
  a control unit which is connected to the detection device and the air-blasting device, which control unit is designed to send a control signal to the air-blasting device when the detection device detects that the top ring-shaped label is held against the stop surface of the pick-up head by the retaining devices, and in which the air-blasting device is designed to deliver the blast of air on the basis of the control signal from the control unit.

The retaining devices are, for example, formed by suction openings in the stop surface of the pick-up head, in which the suction openings are connected, via air ducts, to a device for applying an underpressure in the suction openings. As a result thereof, the top ring-shaped label can be held against the stop surface by means of underpressure. In this case, the detection device may, for example, be designed as a pressure sensor for determining whether the top ring-shaped label is retained by detecting a change in pressure in the suction openings. If the pressure sensor detects that the suction openings suck vacuum, the top ring-shaped label will have been sucked up against the stop surface. The pressure sensor is connected to the control unit which then sends the control signal to the air-blasting device on the basis of which the air-blasting device delivers one or more blasts of air. Therefore, the air-blasting device is actuated at a point in time after the top ring-shaped label has been retained.

The invention also relates to a label-transferring device for arranging a ring-shaped label in an injection mould, comprising a device for removing a ring-shaped label from a pack of substantially identical, abutting ring-shaped labels, as described above, and in which the label-transferring device is designed to transfer said top ring-shaped label into the injection mould after the top ring-shaped label is being held against the stop surface of the pick-up head by the retaining devices. In this case, the label-transferring device may be provided with a holder which is displaceable between a label-receiving position outside the injection mould and a label-dispensing position for dispensing the ring-shaped label in the injection mould, and in which the pick-up head of the device is displaceable between a take-up position for picking up the top ring-shaped label of the pack of ring-shaped labels, and a transfer position for transferring the picked-up ring-shaped label from the stop surface of the pick-up head to the holder in the label-receiving position outside the injection mould.

In the take-up position, the guide rod of the storage holder projects, for example, at least partly into the central recess of the pick-up head. After dispensing the top ring-shaped label of the pack of ring-shaped labels, the dispensed label is held against the stop surface of the pick-up head while the pick-up head is moved to the transfer position.

The invention furthermore relates to a system for producing plastic injection-moulded products, comprising an injection mould with several mould parts which can be moved between a closed position, in which the mould parts bear against each other to form a closed mould cavity with a supply opening for supplying plastic, and an open position, in which the mould parts have been moved apart, as well as a label-transferring device for arranging a ring-shaped label in the injection mould as described above.

In this case, it is possible for the mould parts of the injection mould to be designed such that they form a closed mould cavity in the closed position for producing a plastic injection-moulded product with a tubular body, a neck part which is connected to an end of the tubular body, and a head part which is connected to an end of the neck part which faces away from the tubular body, in which, if desired, the tubular body may comprise an open end which is situated opposite the head part and can be flattened and closed in order to produce a collapsible tube, and in which the holder of the label-transferring device is designed to dispense the ring-shaped label in such a manner that the ring-shaped label comes to lie in a part of the mould cavity which corresponds to the neck part of the plastic injection-moulded product to be produced.

In addition, the invention relates to a method for removing a ring-shaped label from a pack of substantially identical, abutting ring-shaped labels, comprising:

accommodating the pack of ring-shaped labels on a guide rod of a storage holder by pushing the ring-shaped labels onto the guide rod by means of their central openings, which storage holder is provided with a stop for determining a storage position of said pack of ring-shaped labels, in which a bottom ring-shaped label of the pack of ring-shaped labels abuts against the stop on account of the force of gravity and a top ring-shaped label of said pack is situated at a distance from a stop surface of a pick-up head, when the pack of ring-shaped labels is in the storage position, displacing, preferably substantially together as one piece, of at least a part of the pack of ring-shaped labels along the guide rod to a discharge position, in which the top ring-shaped label of the pack of ring-shaped labels or of a part thereof is pushed against the stop surface of the pick-up head, holding the top ring-shaped label which is pushed against the stop surface of the pick-up head in the discharge position against the stop surface of the pick-up head, in which when the pack of ring-shaped labels is accommodated on the guide rod in the storage position, at least part of the pack of ring-shaped labels is displaced along the guide rod to the discharge position by exerting an impact force on said pack of ring-shaped labels, i.e. on the entire pack or on a part thereof, such that at least a part of said pack moves autonomously, counter to the effect of the force of gravity, to the discharge position, and at least one blast of air is delivered which is directed between, preferably laterally between, the retained, top ring-shaped label and the adjacent ring-shaped label in such a manner that the adjacent ring-shaped label is blown off the retained, top ring-shaped label, and preferably also against the adjacent, ring-shaped label which is situated underneath.

When the top ring-shaped label in said discharge position is pushed against the stop surface of the pick-up head and is held against it, it is preferred that several ring-shaped labels which are situated underneath hang around the guide rod and can be moved freely along the guide rod in the direction away from the pick-up head, i.e. downwards along the guide rod.

In this case, it is possible for the blast of air to be directed laterally between an outer peripheral edge of the retained label and an outer peripheral edge of the adjacent ring-shaped label. It is also possible to direct the blast of air along an inner peripheral edge of a central opening in the retained label and/or along an inner peripheral edge of a central opening in the adjacent ring-shaped label.

It is preferred that a part of the top ring-shaped label is bent against a peeling section of the stop surface of the pick-up head in order to move said part of the top ring-shaped label away from the adjacent ring-shaped label so that an increased intermediate space is created between the bent part of the retained label and the adjacent ring-shaped label, and in which the blast of air is directed into said increased intermediate space.

The invention will now be explained in more detail with reference to an exemplary embodiment which is illustrated in the figures, in which:

DETAILED DESCRIPTION

Figure 1:
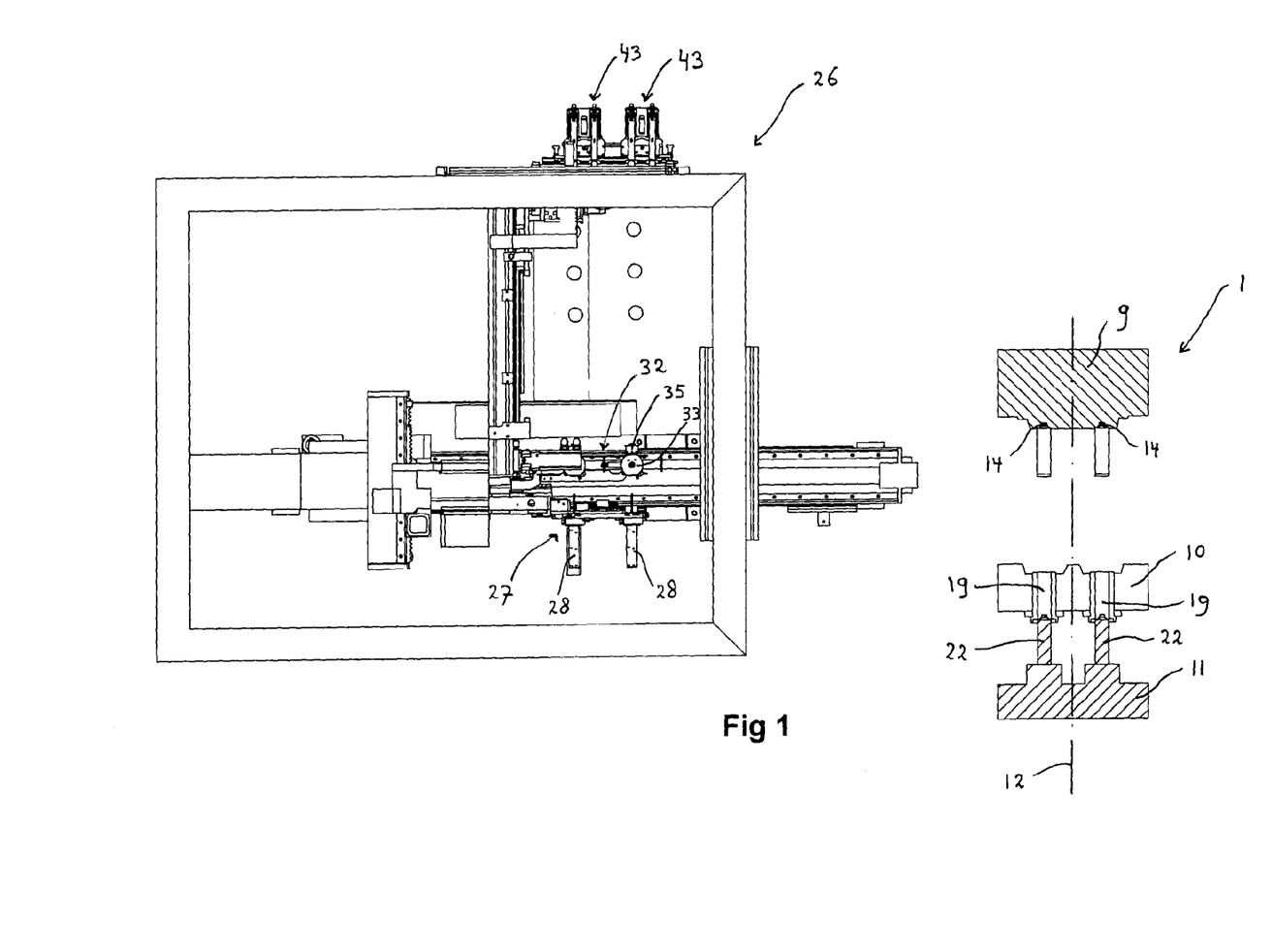
FIG. 1 shows a perspective view of a system for producing plastic injection-moulded products according to the invention.

The system illustrated in FIG. 1 for producing plastic injection-moulded products comprises an injection mould 1 and a label-transferring device 26. In this exemplary embodiment, the system is designed for "in-mould labelling" plastic collapsible tube products 3 (see FIG. 7c). Each collapsible tube product 3 comprises a tubular body 4 and a neck part 5 which is connected to an end of the tubular body 4. A head part 6 is connected to the end of the neck part 5 which faces away from the tubular body 4.

The head part 6 has a dispensing opening. The head part 6 is provided with external screw thread, so that, for example, a lid can be screwed onto the head part 6 to close off the dispensing opening. The tubular body 4 of the collapsible tube product 3 comprises an open end 7 which is situated opposite the head part 6 and can be flattened and closed. The tubular body 4 can be filled via the open end 7. If the open end 7 is flattened and closed after filling, a filled plastic collapsible tube has been produced.

As is illustrated in FIG. 1, the injection mould 1 comprises three mould parts 9, 10, 11. The first mould part 9 comprises several first mould cavities 14. The wall of each first mould cavity 14 comprises a first wall part which corresponds to the shape of the outer surface of the neck part 5 of the collapsible tube product 3 to be produced and a second wall part which corresponds to the shape of the outer surface of the head part 6 of the collapsible tube product 3 to be produced. The first mould part 9 is provided with supply ducts for supplying plastic to the first mould cavities 14 (not shown).

The second mould part 10 comprises several second mould cavities 19. Each second mould cavity 19 comprises a peripheral wall which corresponds to the shape of the outer surface of the tubular body 4 of the collapsible tube product 3 to be produced.

The third mould part 11 comprises several core bodies 22. The wall of each core body 22 comprises a first wall part which corresponds to the shape of the inner surface of the tubular body 4 of the collapsible tube product 3 to be produced, and a second wall part which corresponds to the shape of the inner surface of the neck part 5 and to the shape of the inner surface of the head part 6 of the collapsible tube product 3 to be produced. The second wall part is situated at the head end of the core body 22.

The first, second and third mould part 9, 10, 11 of the injection mould 1 can be moved with respect to each other between a closed position and an open position according to a rectilinear movement in the direction of the axial centre line 12. In the closed position, the first, second and third mould parts 9, 10, 11 lie against each other to produce a closed mould cavity. In the open position (see FIG. 1), the first, second and third mould parts 9, 10, 11 are moved apart, so that the first and second mould cavities 14, 19 are accessible.

The core bodies 22, the second mould cavities 19 and the first mould cavities 14 are aligned with respect to each other, that is to say the axial centre lines of each group of core body 22, second mould cavity 19 and first mould cavity 14 which belong together, substantially coincide. These axial centre lines run substantially parallel to the axial centre line 12 of the injection mould.

The label-transferring device 26 is designed to apply a peripheral label in the second mould cavity 19 and to apply a ring-shaped neck label 40 in the first mould cavity 14, in the open position of the first, second and third mould part 9, 10, 11. The peripheral label and the neck label are two separate labels. The label-transferring device 26 comprises two displacement units 27, 32.

The first displacement unit 27 comprises several mandrels 28 for picking up the peripheral label. The mandrels 28 can be displaced collectively between a peripheral label-receiving position outside the injection mould 1 and a peripheral label-dispensing position in the second mould cavity 19. The second displacement unit 32 comprises several carriers 33, each of which comprises a holder 35 for accommodating the ring-shaped neck label 40.

Each carrier 33 is furthermore provided with engaging members for engaging a shaped collapsible tube product 3. Each carrier 33 is rotatable about a substantially vertical rotation axis between an angular position for removing an injection-moulded product and an angular position for dispensing a neck label. The holders 35 attached to the carriers 33 can be displaced collectively between a neck label-receiving position outside the injection mould 1 and a neck label-dispensing position in the first mould cavity 14 of the first mould part 9.

In the neck label-receiving position outside the injection mould 1, the holders 35 are each provided with in each case a ring-shaped neck label 40. To this end, the label-transferring device 26 comprises a number of devices 43 for removing in each case a single ring-shaped neck label 40 from a pack or stock 41 of substantially identical, abutting ring-shaped labels 40. The packs 41 of ring-shaped neck labels 40 are each accommodated by a storage holder 44 of the devices 43 (see FIG. 2).

Figure 2:
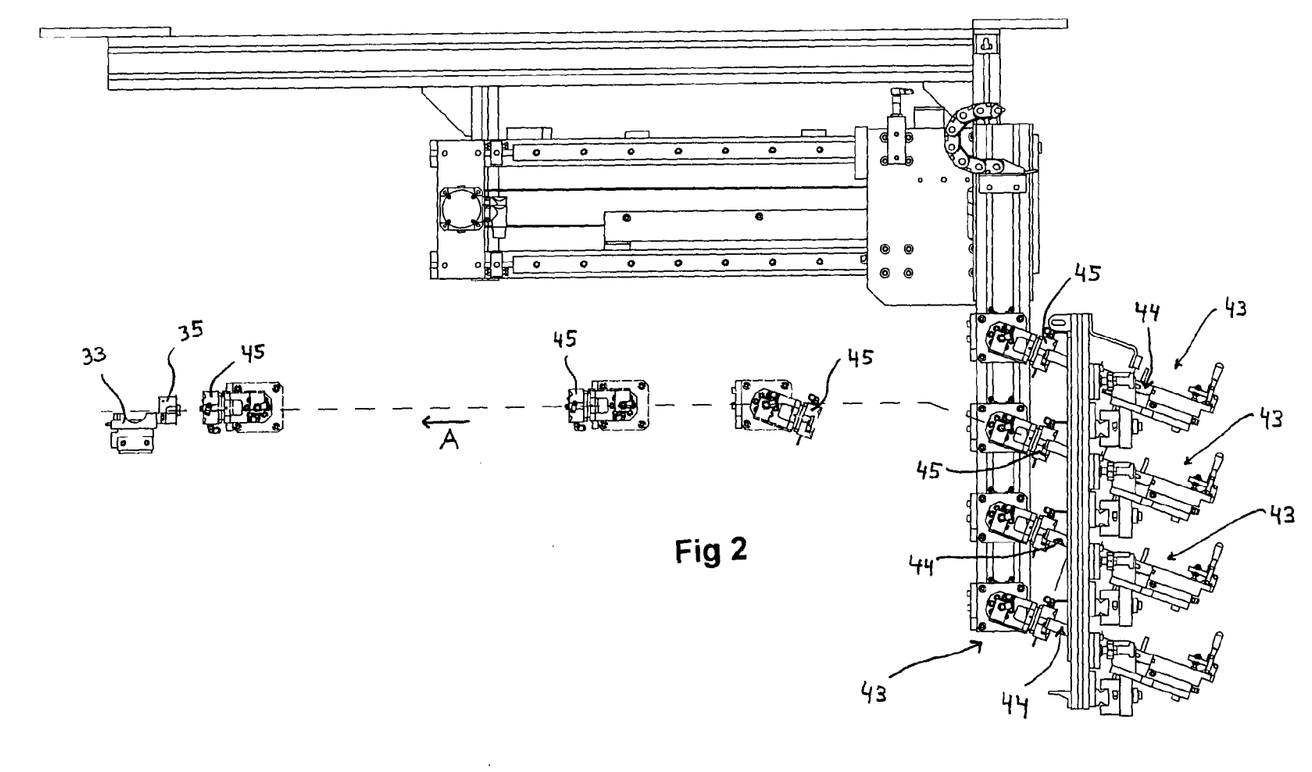
FIG. 2 shows a diagrammatic side view of a part of the label-transferring device of the system illustrated in FIG. 1.

Each device 43 is provided with a pick-up head 45 for picking up the ring-shaped neck label 40. The pick-up head 45 is displaceable between a take-up position for picking up or receiving the top ring-shaped neck label 40 from the pack 41 of ring-shaped labels 40 of the storage holder 44, and a transfer position for transferring the picked-up ring-shaped label 40 from the pick-up head 45 to the holder 35 of the carrier 33 in the label-receiving position outside the injection mould 1. The top ring-shaped label can also be referred to as the outer or front ring-shaped label.

In this exemplary embodiment, the pick-up head 45 is displaced from the take-up position according to the path indicated by a dashed line in FIG. 2 to the transfer position (see arrow A). In this case, the pick-up head 45 in this exemplary embodiment rotates approximately half a turn to turn the picked-up ring-shaped label 40 towards the holder 35 of the carrier 33.

Figure 3:
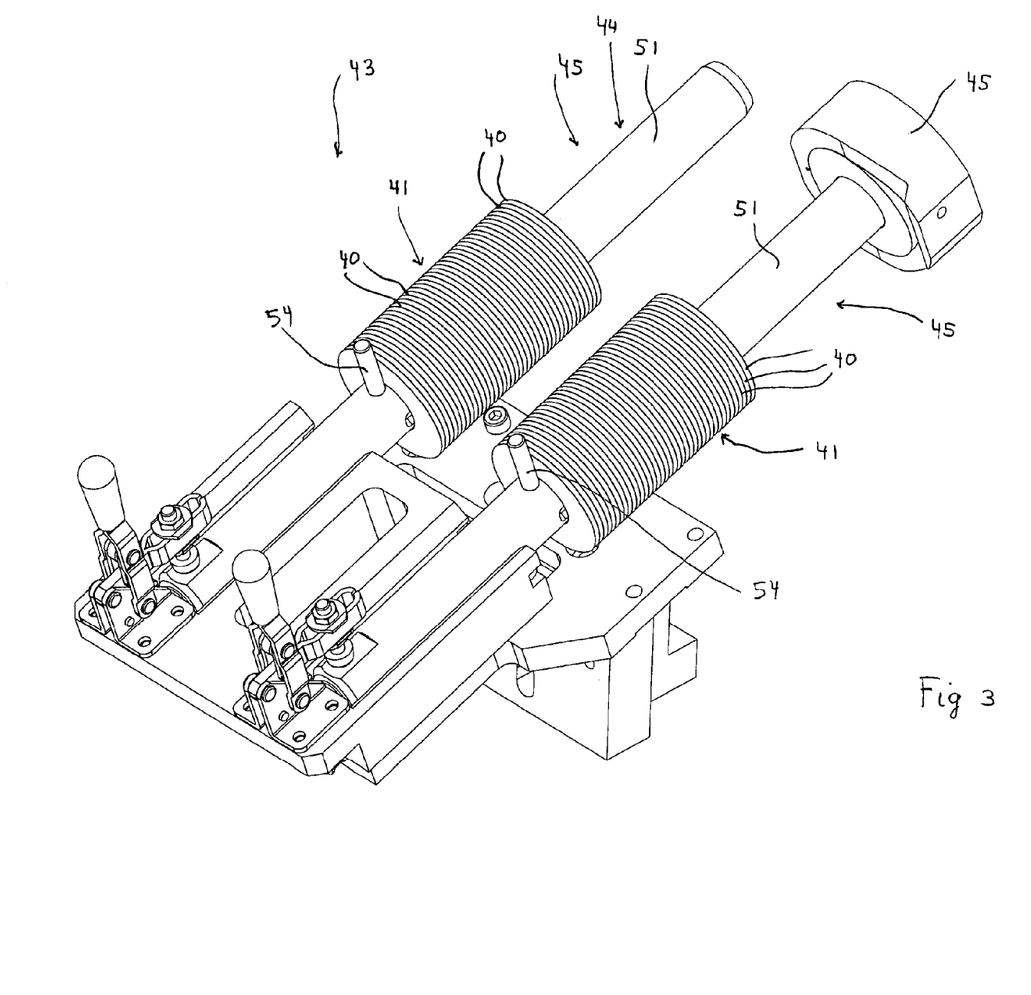
FIG. 3 shows a perspective view of a device for removing of in each case a single ring-shaped label from a pack of ring-shaped labels.

FIG. 3 shows two mutually adjacent devices 43 for removing in each case a single ring-shaped neck label 40 from a pack 41 of substantially identical, abutting ring-shaped labels 40.

The storage holder 44 of each device 43 comprises a guide rod 51 for receiving the central opening of the ring-shaped labels 40 of the pack 41 of ring-shaped labels. The guide rod 51 has an external diameter which is adapted to the central opening of the ring-shaped labels 40. In this exemplary embodiment, the external diameter of the guide rod 51 is approximately 0.5 mm smaller than the central opening of the ring-shaped labels 40. The pack 41 of ring-shaped labels 40 is pushed onto the guide rod 51.

Figure 4:
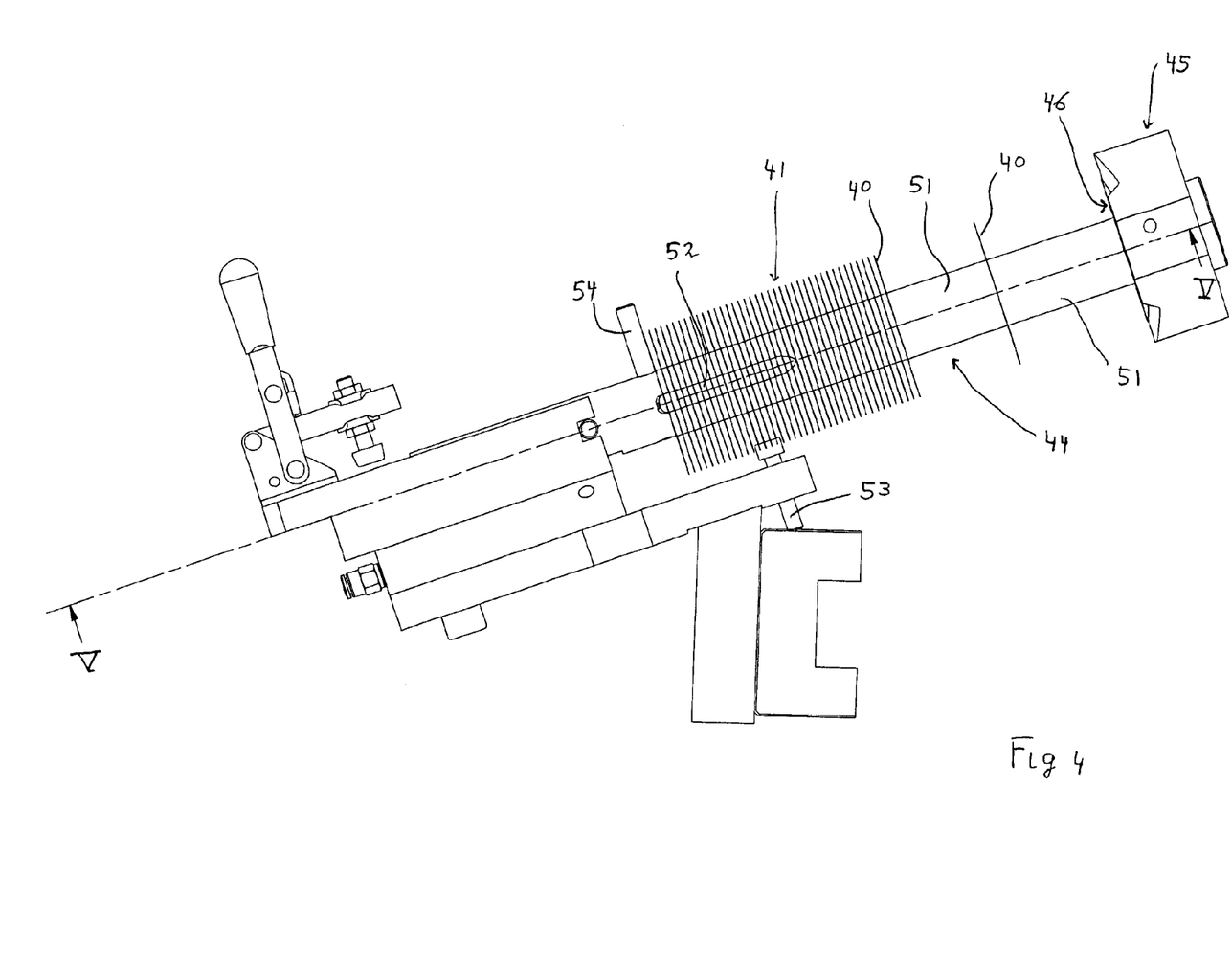
FIG. 4 shows a side view of the device shown in FIG. 3.

The guide rod 51 is arranged obliquely with respect to the horizontal. The angle of inclination between the guide rod 51 and the horizontal is, for example, between 20-50°. The angle of inclination can be adjusted by means of an adjusting screw 53 (see FIG. 4). Due to the oblique position of the guide rod 51, the pack 41 of ring-shaped neck labels 40 bears against a stop 54 on account of the force of gravity. In this exemplary embodiment, the stop 54 is formed by a pen which projects transversely from the guide rod 51.

When the pack 41 of ring-shaped labels 40 bears against the stop 54, the pack 41 of ring-shaped labels 40 is in a storage position or waiting position. In this case, the outer ring-shaped neck label 40 of the pack 41 is at a distance from the pick-up head 45. In order to move the pack 41 of ring-shaped labels 40 upwards along the guide rod 51 from the storage position against a stop surface 46 of the pick-up head 45, lateral air outlets 52 are provided in the guide rod 51 (see FIGS. 4 and 5).

Figure 5:
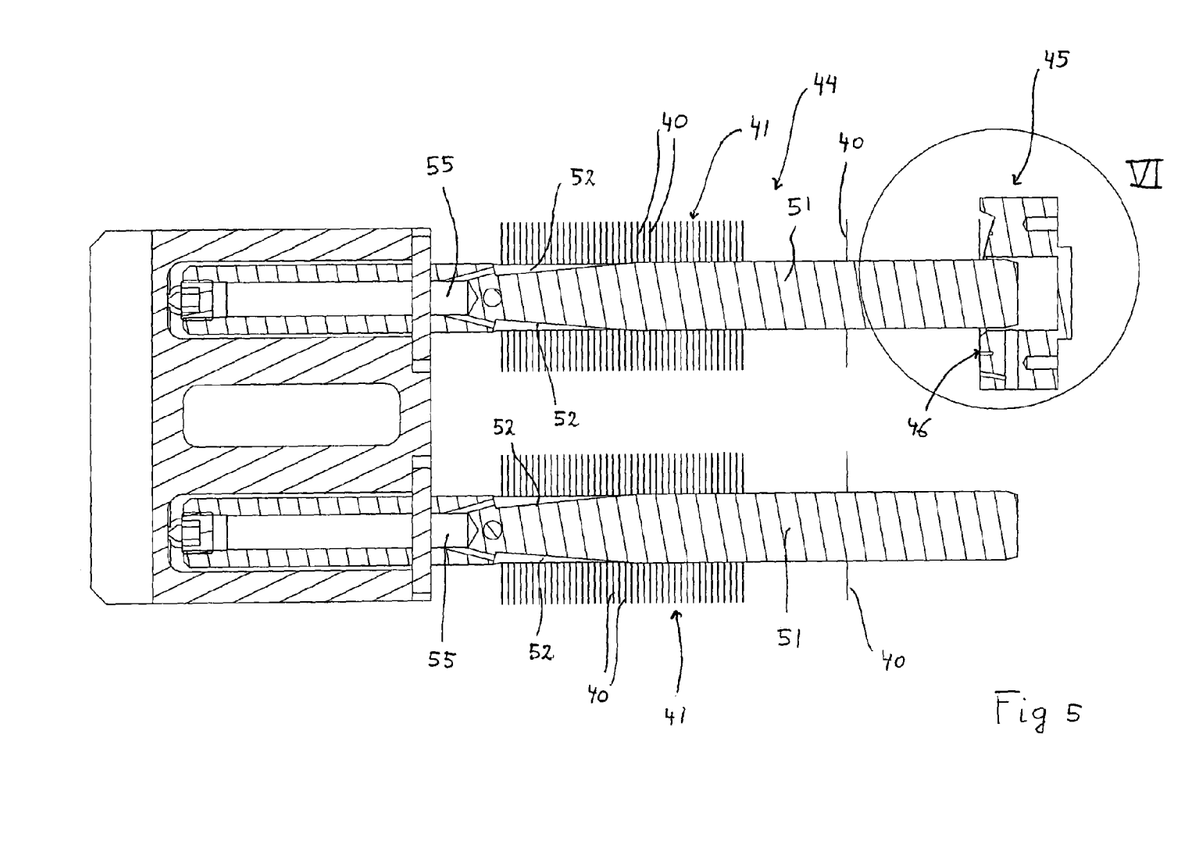
FIG. 5 shows a view in cross section along V-V in FIG. 4.

Each air outlet 52 is slot-shaped and extends in the axial direction of the guide rod 51, for example, approximately a few centimeters from the stop 54. The air outlets 52 are directed obliquely forwards, that is to say radially outwards and in the direction of the pick-up head 45. The air outlets 54 are connected to an internal duct 55 which is connected to a blowing device (not shown). By means of the blowing device, air can be blown out of the air outlets via the internal duct 55.

The expelled air flows obliquely forward between the ring-shaped neck labels 40 of the pack 41. In this exemplary embodiment, substantially the entire pack 41 of ring-shaped neck labels 40 moves substantially together as one piece upwards along the guide rod 51 until the top ring-shaped neck label 40 is pushed against the stop surface 46 of the pick-up head 45. The pack 41 of ring-shaped labels 40 thus reaches a discharge position for delivering the top ring-shaped neck label 40 to the pick-up head 45. Depending on the number of labels in the pack, it is also possible, according to the invention, to move a part of the pack upwards along the guide rod 51, that is to say not all labels but only a part of the labels (not shown).

Although in this exemplary embodiment the pack 41 of ring-shaped neck labels 40 is moved from the storage position to the discharge position by means of blow air from the air outlets 52 in the guide rod 51, the displacement of the pack 41 of ring-shaped neck labels 40 to the discharge position may incidentally be carried out in various other ways. For example, a mechanical displacement device may be used for that.

Figure 6:
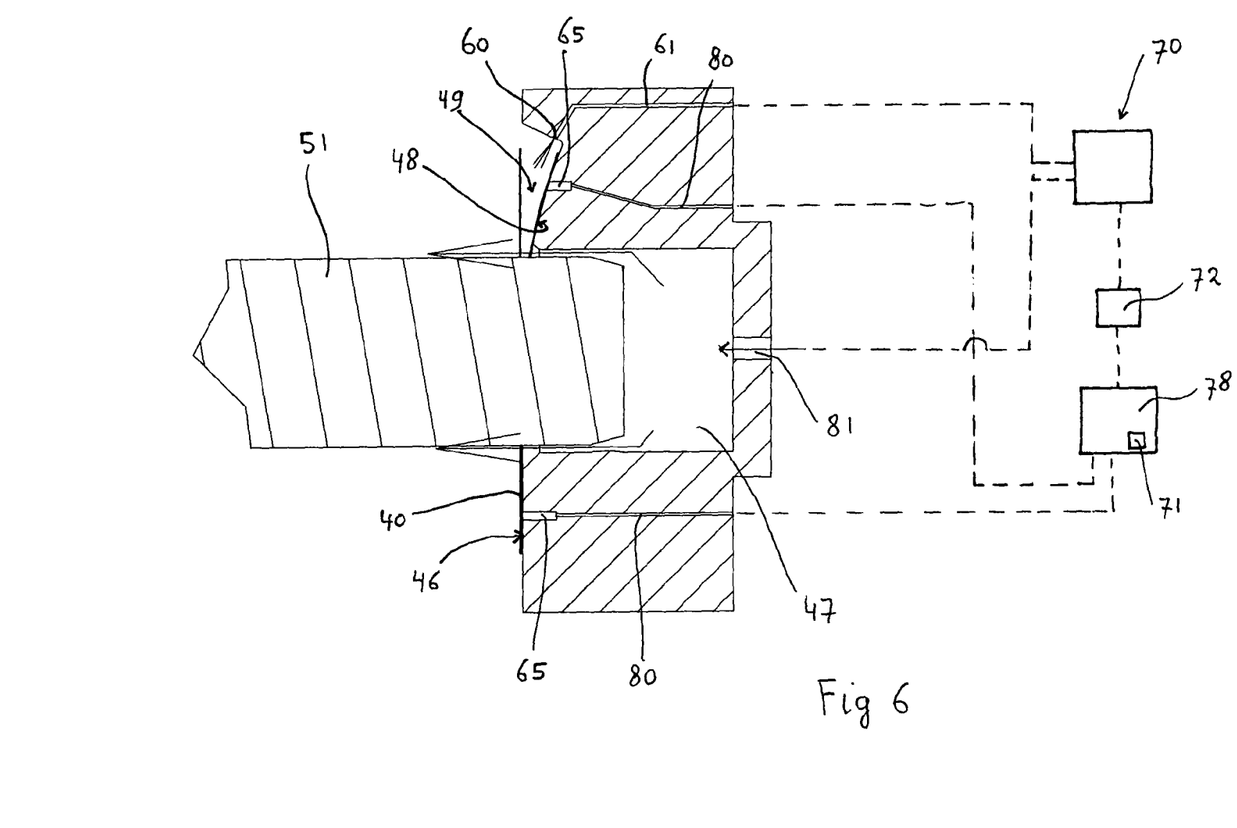
FIG. 6 shows an enlarged detail VI from FIG. 5.

The pick-up head 45 is most clearly illustrated in FIG. 6. The pick-up head 45 is provided with a stop surface 46 against which the top ring-shaped label 40 of the pack 41 is pushed in the discharge position. The pick-up head 45 is provided with retaining devices for retaining the outer ring-shaped neck label 40.

The retaining devices may be designed in various ways. In this exemplary embodiment, the retaining devices comprise several fluid openings 65 in the stop surface 46 for sucking in air in order to apply underpressure with respect to the environment. By means of air ducts 80, the fluid openings 65 are connected to a device 78 for applying underpressure, such as a vacuum pump. This is shown diagrammatically in FIG. 6 by means of a dashed line.

While air is being sucked in via the fluid openings, a suction force is exerted on the top ring-shaped neck label 40 when the pack 41 is pushed against the stop surface 46. As a result thereof, the top ring-shaped neck label 40 is sucked against the stop surface 46 and retained.

Incidentally, the fluid openings can also be used as blow-off device to blow the ring-shaped neck label 40 off the stop surface 46 of the pick-up head 45 to the holder 34 of the carrier 33 in the transfer position of the pick-up head 45.

In this exemplary embodiment, the pick-up head 45 has a central recess 47. The central recess 47 has an internal diameter which is adapted to the guide rod 51. In the take-up position of the pick-up head 45 for picking up the top ring-shaped neck label 40, the pick-up head 45 is partly arranged over the guide rod 51. The guide rod 51 then projects partly into the central recess 47. In this case, the stop surface 46 of the pick-up head 45 extends around the central recess 47.

The stop surface 46 of the pick-up head 45 comprises a peeling section 48 which runs back with respect to the other part of the stop surface 46. The retaining devices of the pick-up head 45 extend into the peeling section 48. In this exemplary embodiment, the peeling section 48 comprises one or more fluid openings 65 for sucking in air for applying underpressure with respect to the environment. The fluid openings 65 of the peeling section 48 are connected via air ducts 80 to the device 78 for applying underpressure (see the dashed line in FIG. 6).

When the top ring-shaped neck label 40 contacts the stop surface 46 of the pick-up head 45, the retaining devices 65 of the pick-up head 45 engage with the top ring-shaped neck label 40. By means of the retaining devices 65 in the peeling section 48, a part of the top ring-shaped label 40 is bent along the peeling section 48.

In this exemplary embodiment, when air is being sucked in through the fluid openings 65 of the peeling section 48, a suction force is exerted on the adjacent part of the top ring-shaped neck label 40, which consequently bends against the peeling section 48. The bent part of the top ring-shaped label 40 thus bends away from the adjacent ring-shaped label 40, resulting in an increased intermediate space 49.

The device 43 comprises an air-blasting device 70 for delivering one or more blasts of air or jets of air which, if the top ring-shaped label 40 is retained, are directed into the increased intermediate space 49. In this exemplary embodiment, the air-blasting device 70 comprises an internal air duct 61 which is arranged in the pick-up head 45. The internal air duct 61 ends in an air outlet aperture 60. If the top ring-shaped neck label 40 is retained against the stop surface 46 and the peeling section 48 thereof, the air outlet aperture 60 is directed laterally into the increased intermediate space 49 between the bent part of the retained ring-shaped neck label 40 and the adjacent ring-shaped neck label 40.

In order to deliver the blast of air or blasts of air from the air outlet aperture 60 at the correct point in time, the device 78 for applying underpressure is provided with a detection device 71 for determining when the top ring-shaped label 40 is held against the stop surface 46. The detection device 71 is, for example, formed by a pressure sensor which detects when the fluid openings 65 are sucking vacuum.

The device 78, in particular the detection device 71 thereof, is connected to a control unit 72 which is also connected to the air-blasting device 70. If the detection device 71 have detected that the top ring-shaped label 40 is retained, the control unit 72 sends a control signal to the air-blasting device 70 in order to deliver one or more blasts of air to the air duct 61 and the air outlet aperture 60.

The adjacent ring-shaped neck label 40 is thus blown off the retained ring-shaped neck label 40 and back against the ring-shaped neck labels 40 situated underneath. As a result thereof, the risk of the adjacent ring-shaped neck label 40 "sticking" to the retained neck label 40 is minimal, thus ensuring that in each case only a single ring-shaped neck label 40 is removed from the pack 41.

Furthermore, the air-blasting device in this exemplary embodiment is designed to deliver one or more blasts of air or jets of air to an air supply duct 81 which ends in the central recess 47 of the pick-up head 45, if the top ring-shaped neck label 40 is held against the stop surface 46. The blast of air or blasts of air dispensed via the supply duct 81 flow along an inner peripheral edge of a central opening in the top ring-shaped neck label 40 and along an inner peripheral edge of the central openings in the adjacent ring-shaped neck labels 40 situated underneath, which is diagrammatically indicated by arrows in FIG. 6.

Due to the oblique arrangement of the guide rod 51, the pack 41 of neck labels 40 has a tendency, on account of the force of gravity, to fall back to the storage position against the stop 54. Since the neck labels 40 from the pack 41 are relatively thin, the effect of the force of gravity may be insufficient to return the pack 41 of neck labels 40 to the storage position at the desired high speed after removal of the outer neck label 40.

Returning the neck labels 40, and in particular the neck labels 40 which are situated near the retained neck label 40, is speeded up by the blast of air or blasts of air from the air supply duct 81 which flow along the central openings of the retained neck label 40 and the adjacent neck labels 40 of the pack 41. In addition, this has a positive effect on separating the retained neck label 40 from the adjacent neck label 40.

Figure 7A:
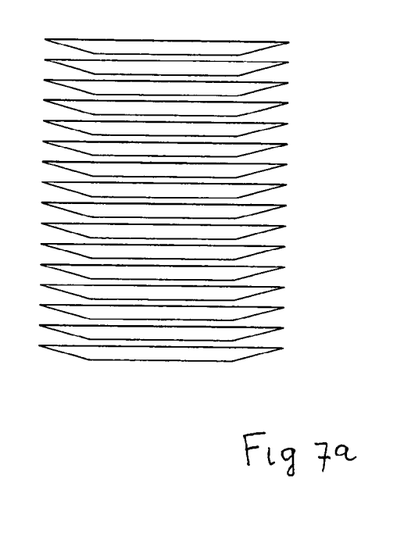
FIGS. 7a, 7b show dish-shaped labels for use in the system shown in FIG. 1.
Figure 7B:
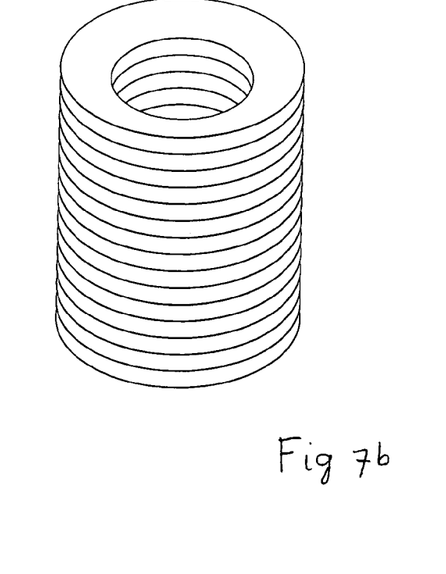
Figure 7C:
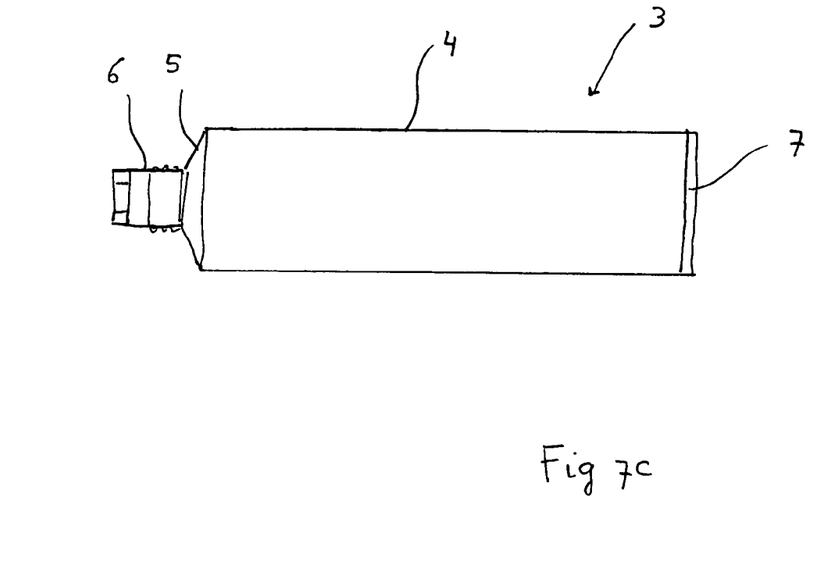
FIG. 7c shows a collapsible tube product which is made using the system shown in FIG. 1.

FIGS. 7a, 7b show a pack of dish-shaped neck labels 40. Instead of the flat neck labels 40 as illustrated in FIGS. 3 to 6, cup-shaped or dish-shaped neck labels 40 can be used. The shape of the stop surface 46 of the pick-up head 45 will in this case be modified accordingly. The action of the device for removing such a ring-shaped label from a pack of such substantially identical, abutting ring-shaped labels is the same as described above.

The invention is not limited to the exemplary embodiment illustrated in the figures. Those skilled in the art can make various modifications which are within the scope of the invention. The features mentioned in the present description and/or the features mentioned in the claims can, each separately or in any desired combination, be used in the device according to claim 1, the label-transferring device according to claim 14, the system according to claim 16 and/or the method according to claim 18.

The invention can furthermore be described by means of the following clauses:

1. Device for removing a ring-shaped label (40) from a pack (41) of substantially identical, abutting ring-shaped labels (40), characterized in that the device (43) comprises:
   a pick-up head (45) which is provided with a stop surface (46) and retaining devices (65) for holding a ring-shaped label (40) against the stop surface (46),
   a storage holder (44) for accommodating the pack (41) of ring-shaped labels (40),
   a displacement device for displacing, when the pack (41) of ring-shaped labels (40) is accommodated by the storage holder (44), said pack (41) of ring-shaped labels (40) from a storage position, in which the pack (41) of ring-shaped labels is accommodated by the storage holder (44) and is situated at a distance from the stop surface (46) of the pick-up head (45), to a discharge position, in which the pack (41) of ring-shaped labels (40) is accommodated by the storage holder (44) and is pushed against the stop surface (46) of the pick-up head (45) by means of an outer ring-shaped label (40) and the outer ring-shaped label (40) can be retained by the retaining devices (65) of the stop surface (46) of the pick-up head (45),
   an air-blasting device (70) for delivering at least one blast of air which, when the outer ring-shaped label (40) is held against the stop surface (46) of the pick-up head (45) by the retaining devices (65), is directed laterally between the retained, outer ring-shaped label (40) and the adjacent ring-shaped label (40) of the pack (41) of ring-shaped labels (40), in such a manner that the adjacent ring-shaped label (40) is blown off the retained, outer ring-shaped label (40).

2. Device according to clause 1, in which the air-blasting device (70) is configured to deliver at least one blast of air which, when the outer ring-shaped label (40) is held against the stop surface (46) of the pick-up head (45) by the retaining devices (65), is directed laterally between an outer peripheral edge of the retained, outer ring-shaped label (40) and an outer peripheral edge of the adjacent ring-shaped label (40) of the pack (41) of ring-shaped labels (40).

3. Device according to clause 1 or 2, in which the air-blasting device (70) is configured to deliver at least one blast of air which is directed such that, when the outer ring-shaped label (40) is held against the stop surface (46) of the pick-up head (45) by the retaining devices (65), the blast of air flows along an inner peripheral edge of a central opening in the outer ring-shaped label (40) and/or along an inner peripheral edge of a central opening in the adjacent ring-shaped label (40) of the pack (41) of ring-shaped labels (40).

4. Device according to one of the preceding clauses, in which the stop surface (46) of the pick-up head (45) is provided with a peeling section (48), and in which the retaining devices (65) are configured to bend, in the discharge position of the pack (41) of ring-shaped labels (40), a part of the outer ring-shaped label (40) against the peeling section (48) in order to move said part of the outer ring-shaped label (40) away from the adjacent ring-shaped label (40) in order to form an increased intermediate space (49) in between, and in which the air-blasting device is configured to deliver at least one blast of air which is directed into said increased intermediate space (49).

5. Device according to clause 4, in which the peeling section (48) of the stop surface (46) of the pick-up head (45) is recessed with respect to the other part of the stop surface (46).

6. Device according to one of the preceding clauses, in which the storage holder (44) is provided with a guide rod (51) for receiving a central opening of the ring-shaped labels (40) of the pack (41) of ring-shaped labels (40), and in which the displacement device is configured, when the pack (41) of ring-shaped labels (40) is accommodated on the guide rod (51), to move the pack (41) of ring-shaped labels (40) from the storage position to the discharge position along the guide rod (51).

7. Device according to clause 6, in which the pick-up head (45) is provided with a central recess (47), in which the guide rod (51) can be at least partly accommodated in the central recess (47) of the pick-up head (45), and in which the stop surface (46) of the pick-up head (45) extends around the central recess (47).
8. Device according to one of the preceding clauses, comprising the pack (41) of ring-shaped labels (40) which is accommodated by the storage holder (44).
9. Device according to one of the preceding clauses, in which the device is provided with:
   a detection device (71) for detecting when the outer ring-shaped label (40) is held against the stop surface (46) of the pick-up head (45) by the retaining devices (65),
   a control unit (72) which is connected to the detection device (71) and the air-blasting device (70), which control unit (72) is configured to send a control signal to the air-blasting device (70) when the detection device (71) detects that the outer ring-shaped label (40) is held against the stop surface (46) of the pick-up head (45) by the retaining devices (65), and
in which the air-blasting device (7) is configured to deliver the blast of air on the basis of the control signal of the control unit (72).
10. Label-transferring device for arranging a ring-shaped label (40) in an injection mould (1), comprising:
    a device (43) for removing a ring-shaped label (40) from a pack (41) of substantially identical, abutting ring-shaped labels (40) according to one of the preceding clauses, and
    a holder (35) which is displaceable between a label-receiving position outside the injection mould (1) and a label-dispensing position for dispensing the ring-shaped label (40) in the injection mould (1),
in which the pick-up head (45) of the device (43) is displaceable between a take-up position for receiving the outer ring-shaped label (40) of the pack (41) of ring-shaped labels (40) against the stop surface (46), and a transfer position for transferring the received ring-shaped label (40) from the stop surface (46) of the pick-up head (45) to the holder (35) in the label-receiving position outside the injection mould (1).
11. System for producing plastic injection-moulded products, comprising:
    an injection mould (1) with several mould parts (9, 10, 11) which are displaceable between a closed position, in which the mould parts (9, 10, 11) bear against each other to form a closed mould cavity, and an open position, in which the mould parts (9, 10, 11) have been moved apart, as well as
    a label-transferring device (26) according to clause 10 for arranging a ring-shaped label (40) in the injection mould (1).
12. System according to clause 11, in which the mould parts (9, 10, 11) of the injection mould (1) are configured for, in the closed position, forming a closed mould cavity for producing a plastic injection-moulded product (3) with a tubular body (4), a neck part (5), which is connected to an end of the tubular body (4), and a head part (6), which is connected to an end of the neck part (5) which faces away from the tubular body (4), in which the tubular body (4), optionally, comprises an open end situated opposite the head part (6) which can be flattened and closed for producing a collapsible tube, and in which the holder (35) of the label-transferring device (26) is configured to dispense the ring-shaped label (40) in such a manner that the ring-shaped label (40) comes to lie in a part of the mould cavity which corresponds to the neck part (5) of the plastic injection-moulded product (3) to be produced.
13. Method for removing a ring-shaped label (40) from a pack (41) of substantially identical, abutting ring-shaped labels (40), comprising:
    displacing the pack (41) of ring-shaped labels (40) from a storage position, in which the pack (41) of ring-shaped labels (40) is situated at a distance from a stop surface (46) of a pick-up head (45), to a discharge position, in which the pack (41) of ring-shaped labels (40) is pushed against the stop surface (46) of the pick-up head (45) by means of an outer ring-shaped label (40),
    holding the outer ring-shaped label (40) of the pack (41) of ring-shaped labels (40) against the stop surface (46) of the pick-up head (45) which is pushed against the stop surface (46) of the pick-up head (45),
    delivering at least one blast of air which is directed laterally between the retained label (40) and the adjacent ring-shaped label (40) of the pack (41) of ring-shaped labels (40) such that the adjacent ring-shaped label (40) is blown off the retained label (40).
14. Method according to clause 13, in which the blast of air is directed laterally between an outer peripheral edge of the retained label (40) and an outer peripheral edge of the adjacent ring-shaped label (40) of the pack (41) of ring-shaped labels (40).
15. Method according to clause 13 or 14, in which the blast of air flows along an inner peripheral edge of a central opening in the retained label (40) and/or along an inner peripheral edge of a central opening in the adjacent ring-shaped label (40) of the pack (41) of ring-shaped labels (40).
16. Method according to one of clauses 13-15, in which a part of the outer ring-shaped label (40) is bent against a peeling section (48) of the stop surface (46) of the pick-up head (45) in order to move said part of the outer ring-shaped label (40) away from the adjacent ring-shaped label (40) so that an increased intermediate space (49) is created between the bent part of the retained label (40) and the adjacent ring-shaped label (40), and in which the blast of air is directed into said increased intermediate space (49).
The invention claimed is:
1. A device for removing a ring-shaped label from a pack of substantially identical, abutting ring-shaped labels, which device comprises:
   a pick-up head which is provided with a stop surface and retaining devices for holding a ring-shaped label against the stop surface,
   a storage holder for accommodating the pack of ring-shaped labels, which storage holder is provided with a guide rod for receiving a central opening of the ring-shaped labels of the pack of ring-shaped labels, and which storage holder is provided with a stop for determining, when the pack of ring-shaped labels is accommodated on the guide rod, a storage position of said pack of ring-shaped labels, in which the pack of ring-shaped labels abuts against the stop on account of the force of gravity by means of a bottom ring-shaped label of said pack and is situated at a distance from the stop surface of the pick-up head by means of a top ring-shaped label of said pack,
   a displacement device for displacing, when the pack of ring-shaped labels is accommodated on the guide rod in the storage position, at least a part of said pack of ring-shaped labels along the guide rod to a discharge position, in which the pack of ring-shaped labels or a part thereof is pushed against the stop surface of the pick-up head by means of the top ring-shaped label and the top ring-shaped label can be held by the retaining devices of the stop surface of the pick-up head,
wherein
   the displacement device is configured, when the pack of ring-shaped labels is accommodated on the guide rod in the storage position, to exert such an impact force on said pack of ring-shaped labels that at least a part of said pack moves autonomously, counter to the effect of the force of gravity, to the discharge position, and the device is provided with an air-blasting device for dispensing at least one blast of air which, when the top ring-shaped label is held against the stop surface of the pick-up head by the retaining devices, is directed between the retained, top ring-shaped label and the adjacent ring-shaped label of the pack of ring-shaped labels, in such a manner that said adjacent ring-shaped label is blown off the retained, top ring-shaped label.

2. The device according to claim 1, in which the displacement device is configured to, when the pack of ring-shaped labels is accommodated on the guide rod in the storage position, to exert such an impact force on said pack of ring-shaped labels that at least a part of said pack moves autonomously, counter to the effect of the force of gravity, to the discharge position, and, when the top ring-shaped label in said discharge position is pushed against the stop surface of the pick-up head and is held against it, a plurality of the ring-shaped labels situated underneath the top ring-shaped label hang around the guide rod and can be moved freely along the guide rod in the direction away from the pick-up head.

3. The device according to claim 1, in which the guide rod is arranged obliquely with respect to the horizontal.

4. The device according to claim 3, in which the guide rod arranged at an angle of 20-50° with respect to the horizontal.

5. The device according to claim 1, in which the guide rod is arranged at an angle with respect to the horizontal which can be adjusted by means of an adjustment device, such as an adjusting screw.

6. The device according to claim 1, in which the displacement device is configured in such a manner that the impact force which is exerted on the pack of ring-shaped labels in the storage position is formed by a blast of air which is blown against one or more of the ring-shaped labels of said pack.

7. The device according to claim 1, in which the guide rod is provided with at least one lateral air outlet which is configured such that, when the pack of ring-shaped labels is accommodated on the guide rod, a blast of air which is blown from the air outlet is blown against one or more of the ring-shaped labels of said pack in order to move at least a part of said pack of ring-shaped labels autonomously, counter to the effect of the force of gravity, to the discharge position.

8. The device according to claim 7, in which the lateral air outlet is directed obliquely in the direction of the pick-up head.

9. The device according to claim 1, in which the air-blasting device is configured to deliver at least one blast of air which, when the top ring-shaped label is held against the stop surface of the pick-up head by the retaining devices, is directed laterally between an outer peripheral edge of the retained, top ring-shaped label and an outer peripheral edge of the adjacent ring-shaped label.

10. The device according to claim 1, in which the air-blasting device is configured to deliver at least one blast of air which is directed in such a manner that, when the top ring-shaped label is held against the stop surface of the pick-up head by the retaining devices, said blast of air flows at least along an inner peripheral edge of a central opening in the top ring-shaped label and along an inner peripheral edge of a central opening in the adjacent ring-shaped label in order to blow said adjacent ring-shaped label back in the direction away from the pick-up head.

11. The device according to claim 1, in which the stop surface of the pick-up head is provided with a peeling section, and in which the retaining devices are configured to bend, in the discharge position, a part of the top ring-shaped label against the peeling section in order to move said part of the top ring-shaped label from the adjacent ring-shaped label to create an increased intermediate space in between, and in which the air-blasting device is configured to deliver at least one blast of air which is directed into said increased intermediate space.

12. The device according to claim 1, comprising the pack of ring-shaped labels which is accommodated on the guide rod, in which, for example, the ring-shaped labels are each made of a plastic film having a thickness of 40-140 µm.

13. The device according to claim 1, in which the device is provided with:
a detection device for detecting when the top ring-shaped label is held against the stop surface of the pick-up head by the retaining devices,
a control unit which is connected to the detection device and the air-blasting device, which control unit is configured to send a control signal to the air-blasting device when the retaining devices detects that the top ring-shaped label is held against the stop surface of the pick-up head by the retaining devices, and
in which the air-blasting device is configured to deliver the blast of air on the basis of the control signal of the control unit.

14. A label-transferring device for arranging a ring-shaped label in an injection mould, comprising a device for removing a ring-shaped label from a pack of substantially identical, abutting ring-shaped labels according to claim 1, and in which the label-transferring device is configured to transfer said top ring-shaped label into the injection mould, after the top ring-shaped label is being held against the stop surface of the pick-up head by the retaining devices.

15. The label-transferring device according to claim 14, comprising:
a holder which is displaceable between a label-receiving position outside the injection mould and a label-dispensing position for dispensing the ring-shaped label in the injection mould,
in which the pick-up head of the device is displaceable between a take-up position for receiving the top ring-shaped label of the pack of ring-shaped labels against the stop surface, and a transfer position for transferring the received picked-up ring-shaped label from the stop surface of the pick-up head to the holder in the label-receiving position outside the injection mould.

16. A system for producing plastic injection-moulded products, comprising:
an injection mould with several mould parts which can be moved between a closed position, in which the mould parts bear against each other to form a closed mould cavity with a supply opening for supplying plastic, and an open position, in which the mould parts have been moved apart, as well as
a label-transferring device according to claim 14 for arranging a ring-shaped label in the injection mould.

17. The system according to claim 16, in which the mould parts of the injection mould are configured to form a closed mould cavity in the closed position for producing a plastic injection-moulded product with a tubular body, a neck part which is connected to an end of the tubular body, and a head part which is connected to an end of the neck part which faces away from the tubular body, in which, the tubular body, optionally, comprises an open end which is situated opposite the head part which can be flattened and closed in order to produce a collapsible tube, and in which the holder of the label-transferring device is configured to dispense the ring-shaped label in such a manner that the ring-shaped label comes to lie in a part of the mould cavity which corresponds to the neck part of the plastic injection-moulded product to be produced.

18. A method for removing a ring-shaped label from a pack of substantially identical, abutting ring-shaped labels, comprising:

accommodating the pack of ring-shaped labels on a guide rod of a storage holder by pushing the ring-shaped labels onto the guide rod by means of their central openings, which storage holder is provided with a stop for determining a storage position of said pack of ring-shaped labels, in which the pack of ring-shaped labels abuts against the stop by means of a bottom ring-shaped label of said pack on account of the force of gravity and is situated at a distance from a stop surface of a pick-up head by means of a top ring-shaped label of said pack, displacing at least a part of the pack of ring-shaped labels along the guide rod to a discharge position, in which the pack of ring-shaped labels or a part thereof is pushed against the stop surface of the pick-up head by means of the top ring-shaped label, holding the top ring-shaped label which is pushed against the stop surface of the pick-up head in the discharge position against the stop surface of the pick-up head, wherein when the pack of ring-shaped labels is accommodated on the guide rod in the storage position, at least a part of the pack of ring-shaped labels is displaced along the guide rod to the discharge position by exerting an impact force on said pack of ring-shaped labels such that at least a part of said pack moves autonomously, counter to the effect of the force of gravity, to the discharge position, and at least one blast of air is delivered which is directed between the retained label and the adjacent ring-shaped label such a manner that the adjacent ring-shaped label is blown off the retained label.

19. The method according to claim 18, in which, when the top ring-shaped label is pushed against the stop surface of the pick-up head in said discharge position and is held against it, a plurality of ring-shaped labels which are situated underneath the top ring-shaped label hang around the guide rod and can be moved freely along the guide rod in the direction away from the pick-up head.

20. A device for removing a ring-shaped label from a pack of substantially identical, abutting ring-shaped labels, which device comprises:

a pick-up head which is provided with a stop surface and retaining devices for holding a ring-shaped label against the stop surface, a storage holder for accommodating the pack of ring-shaped labels, which storage holder is provided with a guide rod for receiving a central opening of the ring-shaped labels of the pack of ring-shaped labels, and which storage holder is provided with a stop for determining, when the pack of ring-shaped labels is accommodated on the guide rod, a storage position of said pack of ring-shaped labels, in which the pack of ring-shaped labels abuts against the stop on account of the force of gravity by means of a bottom ring-shaped label of said pack and is situated at a distance from the stop surface of the pick-up head by means of a top ring-shaped label of said pack, a displacement device for displacing, when the pack of ring-shaped labels is accommodated on the guide rod in the storage position, at least a part of said pack of ring-shaped labels along the guide rod to a discharge position, in which the pack of ring-shaped labels or a part thereof is pushed against the stop surface of the pick-up head by means of the top ring-shaped label and the top ring-shaped label can be held by the retaining devices of the stop surface of the pick-up head, wherein the displacement device is configured, when the pack of ring-shaped labels is accommodated on the guide rod in the storage position, to exert such an impact force on said pack of ring-shaped labels that at least a part of said pack moves autonomously, counter to the effect of the force of gravity, to the discharge position, wherein the displacement device is configured in such a manner that the impact force which is exerted on the pack of ring-shaped labels in the storage position is formed by a blast of air which is blown against one or more of the ring-shaped labels of said pack, and the device is provided with an air-blasting device for dispensing at least one blast of air which, when the top ring-shaped label is held against the stop surface of the pick-up head by the retaining devices, is directed between the retained, top ring-shaped label and the adjacent ring-shaped label of the pack of ring-shaped labels, in such a manner that said adjacent ring-shaped label is blown off the retained, top ring-shaped label.

* * * * *